United States Patent [19]
Hastwell

[11] 3,910,789
[45] Oct. 7, 1975

[54] COLOR CORRECTION PROCESS

[75] Inventor: Peter J. Hastwell, North Adelaide, Australia

[73] Assignee: Applied Research of Australia Pty., Limited, Adelaide, Australia

[22] Filed: Feb. 25, 1974

[21] Appl. No.: 445,670

Related U.S. Application Data

[63] Continuation-in-part of Ser. No. 247,302, April 25, 1972, abandoned.

[52] U.S. Cl. ................................ 96/1.2; 96/1 C
[51] Int. Cl.² ................................ G03G 13/22
[58] Field of Search ............... 96/1.2, 9, 1 C; 355/4

[56] References Cited
UNITED STATES PATENTS

| | | | |
|---|---|---|---|
| 2,986,466 | 5/1961 | Kaprelian | 96/1.2 |
| 3,043,686 | 7/1962 | Bickmore | 96/1.2 |
| 3,057,720 | 10/1962 | Hayford et al. | 96/1.2 |
| 3,420,151 | 1/1969 | Levine et al. | 355/4 |
| 3,615,391 | 10/1971 | Honjo et al. | 96/9 X |
| 3,754,908 | 8/1972 | Hercock | 96/1.2 |

*Primary Examiner*—Roland E. Martin, Jr.
*Attorney, Agent, or Firm*—Shenier & O'Connor

[57] ABSTRACT

A process for color correction for use in electrostatic color printing to correct color imperfections in electrophotographic prints owing to deficiencies in the pigments used to produce the color image.

4 Claims, 22 Drawing Figures

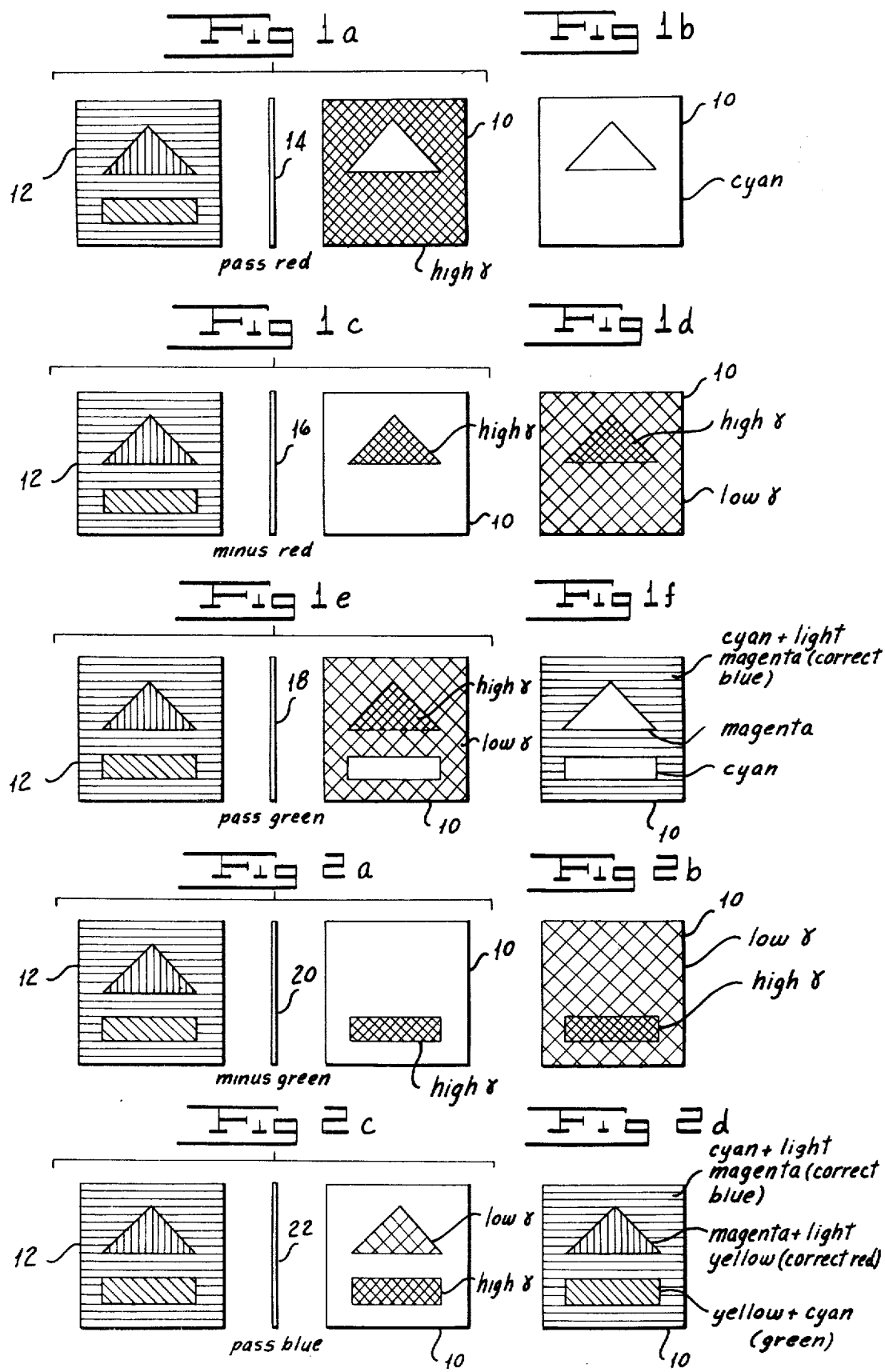

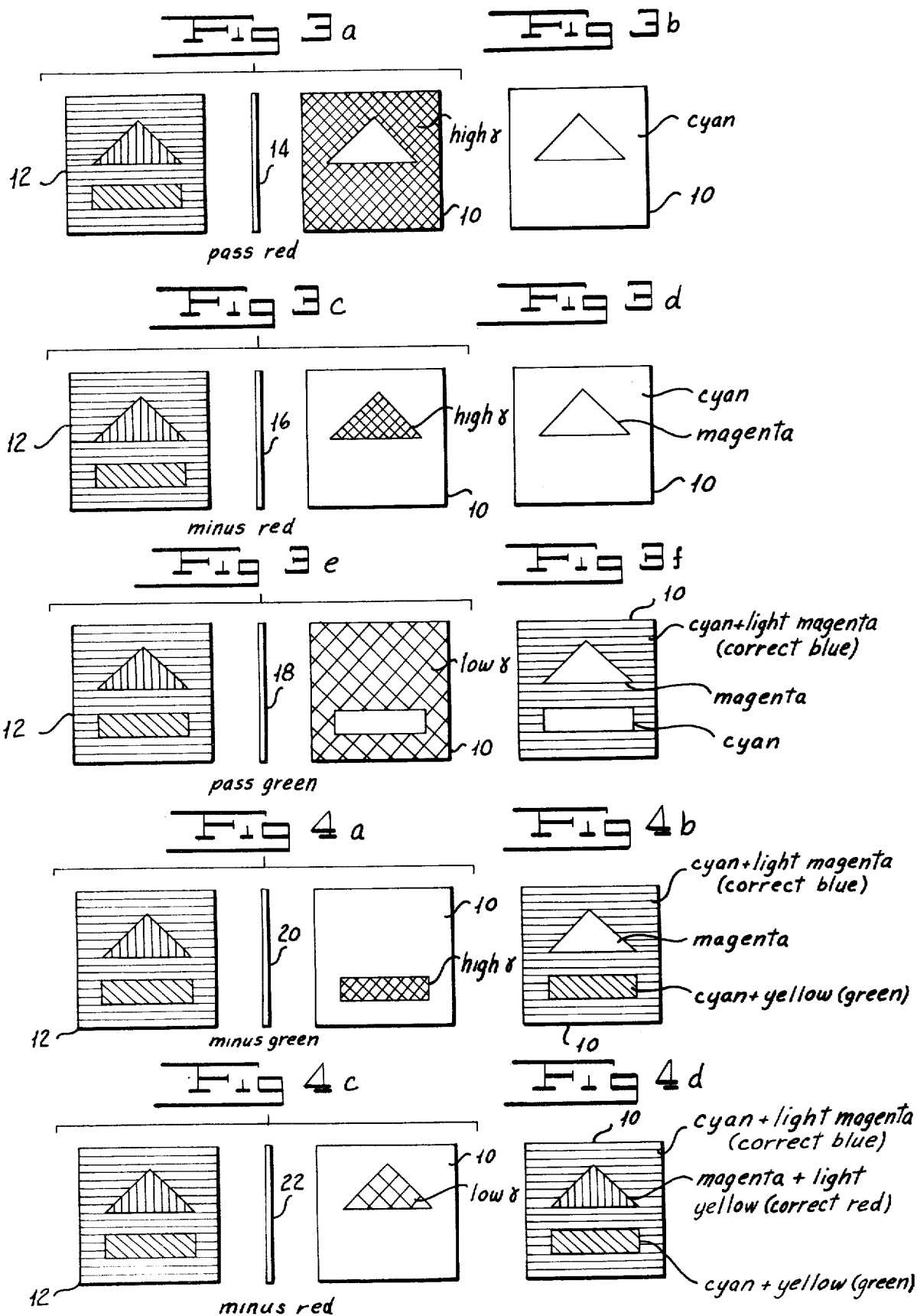

COLOR CORRECTION PROCESS

This application is a continuation in part of my copending application Ser. No. 247,302 filed Apr. 25, 1972, now abandoned.

BACKGROUND OF THE INVENTION

The process of this invention is an improvement of the color correction technique embodied in the electrostatic color printing process described in my copending application Ser. No. 47,273, filed June 18, 1970, now Pat. No. 3,709,594. The need for color correction arises because of deficiencies in the materials used to produce the color image.

The three color pigments used for the production of the three process colors cyan, magenta and yellow for making up a color print by means of the subtractive process are not pure. While the pigment used to produce cyan should theoretically subtract or absorb only red light from the light impinging thereon, as a matter of fact it also absorbs some green light and just a trace of blue light. The cyan pigment may, therefore, be considered to be contaminated with those developer pigments, magenta and yellow pigments, which respectively are to absorb green light and blue light. Since the major apparent contaminant is magenta, a good correction in the composite print can be made by reducing the density of magenta pigment in those areas which are also being developed with cyan pigment.

Similarly, while the magenta pigment should absorb only green light it also absorbs some blue light and a trace of red. The major apparent contaminant is yellow so that a good correction is obtained by reducing the yellow pigment density in those areas which are being developed with magenta and yellow.

Yellow pigments generally are pure. In the event, however, that an impure yellow pigment were used, correction can be made in a manner analogous to that described above.

Of the pigments normally used the cyan pigment is the least perfect, the magenta next less perfect, and the yellow almost perfect. By using a quinacridone pigment or a magenta lake pigment, which is a dye reacted on the surface of a transparent salt, such as phosphomolybdic tungstic acid on aluminum oxide, it is possible to produce an excellent print with only one correction. That correction would be the reduction of magenta pigment where both cyan and magenta are to be printed. Laked pigments, however, suffer from poor light fastness.

In the development of a blue region, which requires successive depositions of cyan and magenta developers, a color correction must be made which will account for the over-deposition of magenta developer owing to the small amount of magenta apparently present in the cyan. Similarly, in the development of a red region requiring deposition of yellow and magenta, a color correction must be applied because the magenta developer apparently contains a small yellow component. This color correction technique is described in my copending application for patent, and the present improvement of this invention achieves its results by the mode of controlling the quantity of component developers applied to the region of interest in such a manner as to more accurately compensate for the color response of the impurities in the developers. The color correction method described in my copending application uses a momentary exposure of the photoconductor (P.C. hereinafter) through a filter of the same color as that of the region being printed to reduce charge density and prevent overdeposition of the one developer which is also present as a small contaminant in the other.

For example, in the electrostatic color printing machine of my copending application the normal development sequence for reproduction of a blue region is charging the P.C., exposing it to light from the original transparency transmitted through a red filter, and developing it in cyan, followed by re-charging, exposing through a green filter and developing in magenta. Uncorrected, this color development sequence would result in excessive deposition of magenta on the P.C. To compensate for the magenta contribution of the cyan developer, the following development sequence is used. The P.C. is charged, exposed through the red filter and developed in cyan. However, following the re-charging and exposure of the P.C. through the green filter, there is interposed a momentary exposure through a blue filter followed by development in magenta. The effect of the momentary exposure of the P.C. through the blue filter is to diminish the static charge distribution over the area to be developed with magenta in this step, so that less magenta will be deposited. This compensates for the undesirable deposition of magenta in the cyan development step. In a similar manner, red regions are corrected for the excessive deposition of yellow developer by momentary exposure of the P.C. through a red filter to reduce charge in the region being developed so that less yellow developer is attracted. This compensates for the yellow contaminant in the magenta developer.

The process described above controls P.C. charge density by varying the length of time during which the color region is exposed through the corrective filter. The charging voltage is not varied in a particular color development sequence. The voltage used to charge a particular type of P.C. preceding its exposure to a specific color filter and light source is related to the color contrast achieved in development by a factor called gamma. As is known in the photographic arts, the term "gamma" indicates the degree of contrast of a developed photographic image. It is also the slope of the straight line portion of the characteristic curve of a photographic material or process. Thus, as will more fully be pointed out hereinbelow, in electrophotography, a "high gamma" voltage is that corona charging voltage which will produce an image of high contrast while a "low gamma" corona voltage is one which will produce an image of low contrast. For a given set of characteristics describing P.C., filter and light source, charging the P.C. at high gamma voltage will yield high color contrast in subsequent development and charging at low gamma voltage will yield low color contrast in subsequent development. The color corrections provided by this procedure improve the color rendition over that produced by the non corrective procedure but these corrections are compromised by the limited charge variation achieved by light exposures alone, which provides only a partial control over developer deposition. I found that green regions so processed lacked color purity and red regions lacked contrast while soft skin tones and blue shades were lost. If a low gamma voltage is used for charging throughout the development sequence then, good greens, blues and skin tones are obtained. However, this is achieved at the expense of the reds which are compromised. If a high gamma voltage is used throughout the development sequence, good greens, reds and blues are obtained but skin tones are lost. Use of an intermediate gamma voltage throughout the development sequence results in similar color improvements with concomitant compromises in other colors.

SUMMARY OF THE INVENTION

One object of my invention is to provide a color correction process for electrostatic color printing which overcomes and corrects the color imperfections in the print owing to deficiencies in the materials used to produce the color image.

Another object of my invention is to provide a novel method of color correction employing special filters during the color printing sequence.

Other and further objects of my invention will appear from the following description.

In general my invention contemplates an improved color correction process for an electrostatic copier in which an area of the print to be color corrected is charged with a high gamma voltage, exposed to the image, developed with a developer of one color, charged with a low gamma voltage, exposed to the image and developed with a developer of a corrective color.

BRIEF DESCRIPTION OF THE DRAWINGS

In the accompanying drawings which form part of the instant specification and which are to be read in conjunction therewith and in which like reference numerals are used to indicate like parts in the various views:

FIGS. 1a to 1f illustrate the steps of one embodiment of my color correction process in producing color correction of one color to be reproduced.

FIGS. 2a to 2d illustrate the steps of one embodiment of my color correction process in producing color correction of another color to be reproduced.

FIGS. 3a to 3f illustrate the steps of an alternate embodiment of my color correction process in producing color correction of one color to be reproduced.

FIGS. 4a to 4d illustrate the steps of the alternate embodiment of my color correction process in producing color correction of another color to be reproduced.

DESCRIPTION OF THE PREFERRED EMBODIMENT

Figure 5:
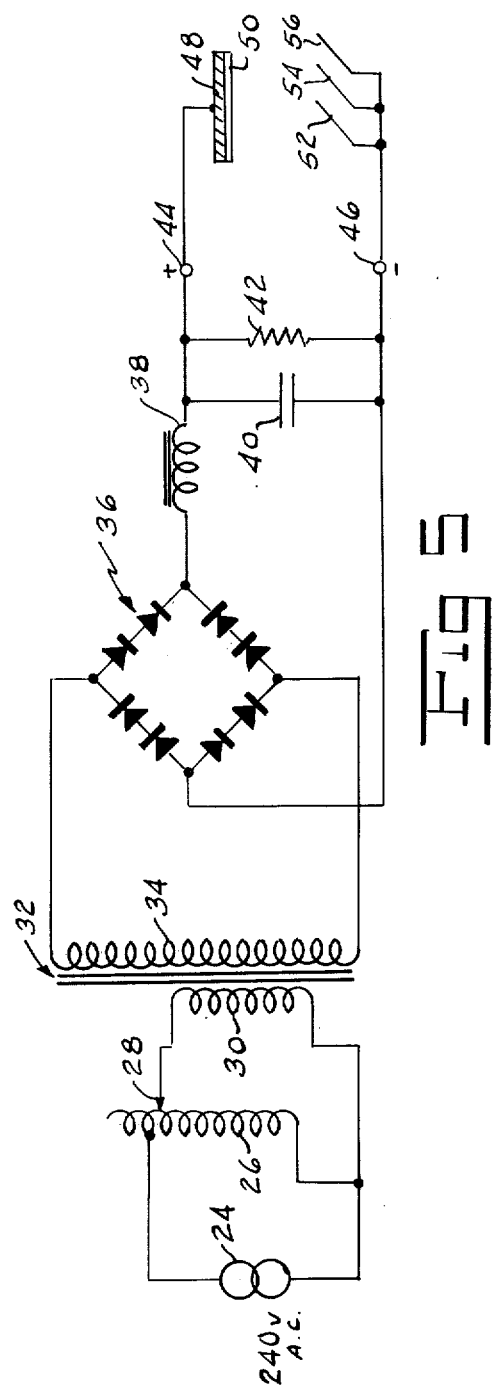
FIG. 5 is a schematic view of one form of corona charger circuit which can be used in the practice of my process.

The improvement comprises use of different color correcting filters, use of varying gamma voltages and changes in the pattern of sequential steps comprising the development and color correction sequence. Referring now to FIGS. 1a to 1f, in one mode of the color correction improvement, for a blue region, I employ the following steps. The photoconductor is charged with a high gamma voltage, exposed to the image 12 through a red filter 14 as indicated in FIG. 1a and developed in cyan as shown in FIG. 1b. All non-red regions of the image will now be developed in the cyan component. After development in cyan the photoconductor is now high gamma charged and then exposed to the image through a minus red filter 16, which permits transmission of all spectral colors except red. This step is shown in FIG. 1c. Since charge is removed everywhere that light impinges on the photoconductive surface, this exposure will insure that a high density charge remains only in red regions. Next, as shown in FIG. 1d, the photoconductor 10 is recharged at a low gamma voltage; this replaces a low density charge in regions where the high density charge had been removed by non-red light. The high density charge remains on the red regions. The photoconductor 10 is exposed to the image through a green filter 18, with this charge pattern now on its surface as shown in FIG. 1e, and then developed in magenta as illustrated in FIG. 1f. The resultant combination of cyan and magenta yields a color corrected blue. The amount of magenta deposited will be less than the amount of cyan deposited in proportion to the gamma voltages preceding each development step. Thus, less magenta will be attracted to low-charge densities in the same regions where cyan had been attracted in greater amount to high charge densities. The amount of magenta so deposited compensates for the deposition of magenta as an impurity in cyan. It is the combination of high and low gamma charge applications and the intervening exposure through a minus red filter that achieves the desired color correction. It will be understood that different voltages may be used in combination with variations of transmission properties of the filter to accomplish the desired color correction.

Having accomplished development of the blue region of the image with color correction, I now develop the red region in a manner to provide color correction. Referring to FIGS. 2a to 2d, this is done by charging the P.C. 10 at a high gamma voltage and then exposing it to the image 12 being produced through a minus green filter 20 as shown in FIG. 2a. This leaves a high gamma charge in the green regions. The P.C. 10 is then recharged at low gamma voltage as indicated in FIG. 2b and is exposed to the image 12 through a blue filter 22 as illustrated in FIG. 2c. At this point, red regions already containing magenta developer will have a less dense charge distribution than the green regions which already contain cyan developer. Next the P.C. is developed in yellow as shown in FIGS. 2d. A nominal quantity of yellow will be deposited in regions containing cyan, to yield the color green. A lesser amount of yellow will be deposited in regions containing magenta. This compensates for the yellow deposited as a contaminant in magenta, and yields a color corrected red.

Referring now to FIGS. 3a to 3f, in another mode of improved color correction for a blue region, I employ the following steps. The photoconductor is charged and exposed to the image through a red filter 14, as shown in FIGS. 3a and 3b, and then developed in cyan. All non-red regions will again be developed in the cyan component. Next, the photoconductor is recharged with a high gamma voltage, exposed to the image 12 through a minus red filter 16 and developed in magenta as shown in FIGS. 3c and 3d. Since the charge has now been removed everywhere but in red regions, the magenta will be attracted solely to these. Then the photoconductor 10 is recharged with a low gamma voltage, exposed to the image 12 through a green filter 18 and developed in magenta as indicated in FIGS. 3e and 3f.

The result is that the amount of magenta deposited in blue regions will again compensate for the magenta deposition as an impurity in cyan. In red regions where magenta is an impurity component of the cyan developer there will, of course, be nominal deposition. The use of the minus red filter in conjunction with successive charges of high and low gamma voltages attains the desired color correction. This color correction, in either method described, is novel in that it controls the magenta deposition in a blue region to any degree, while leaving unaffected other regions in which magenta is an impurity component of the cyan developer.

Having accomplished development of the blue region of the image using the second mode of color correction, I now develop the red region in a manner to provide color correction. Referring to FIGS. 4a to 4d, this is done by charging the P.C. 10 at high gamma voltage, exposing it to the image 12 being produced through a minus green filter 20 and developing it in yellow as shown in FIGS. 4a and 4b. A quantity of yellow proportional to the high gamma charge in the region will be deposited. This quantity of yellow when combined with the cyan present in the region from a prior development step yields the color green. Next the P.C. 10 is charged at low gamma voltage and exposed to the image 12 being produced through a minus red filter 22. A charged region, corresponding to the red region of the image is now left on the surface of the P.C. 10 as shown in FIG. 4c. The P.C. is once more developed in yellow as shown in FIG. 4d. The amount of yellow now deposited on the charged region compensates for the yellow deposited as an impurity in magenta in a prior development step. This combination of yellow and magenta yields a color corrected red. It is understood that the color development and correction sequences herein described, whose control elements are filter type, gamma charging voltage, exposure duration and color developer order, may be selected to yield various color corrections. The procedures described herein have inherent flexibility in that by re-ordering the sequential color printing steps the tonal qualities of the color print may be continuously varied to obtain the desired color corrected print of an original transparency employing pigments containing color contaminants.

My process may be carried out on any suitable apparatus which is adapted to make color prints electrostatically and which is provided with some means for varying the corona charge applied to the photoconductor. For example, the apparatus disclosed in Pat. No. 3,709,594 may be provided with a corona power supply such as is shown in FIG. 5 which power supply is also described in my copending application Ser. No. 17,647 filed March 9, 1970.

The corona power supply shown in FIG. 5 includes a source 24 of 240 volts alternating current providing an input to an auto transformer 26 having an adjustable tap 28. Tap 28 may, for example, provide a range of input voltage of 0–280v to a transformer 32. I connect tap 28 to the primary winding 30 of transformer 32 having a secondary winding connected to a full wave rectifier 36. The turns ratio of the transformer 32 is such that it generates an output of over 7000 volts across the secondary winding 34. Rectifier 36 produces an output which may reach approximately 6500 volts d.c. A filter including a series choke 38 and a parallel capacitor 40 smoothes the output of the rectifier 36. I connect a bleeder resistor 42 across capacitor 44. The power supply provides the corona output voltage across a positive terminal 44 and a negative terminal 46. As is conventional, the positive terminal 44 is applied to a conductive backing 48 of the photoconductor 50. The negative terminal 46 is connected to the corona wires 52, 54 and 56. It will readily be appreciated that the potential applied to the photoconductive layer by the corona wires can be varied by moving the auto transformer tap 28. When the tap is changed to change the voltage applied, the resultant print density changes. The machine provided with the power supply illustrated in FIG. 5 may be provided with any suitable control for moving the slider 28.

It will be understood that the charge applied to the photoconductor may also be changed by using a constant corona potential and by varying the distance between the corona wires and the photoconductor. It will readily be appreciated, however, that as a practical matter such a distance variation is relatively more difficult to achieve than a change in the voltage provided by the power supply. It is for this reason that I prefer to vary the applied voltage to produce the desired effect.

Figure 6:
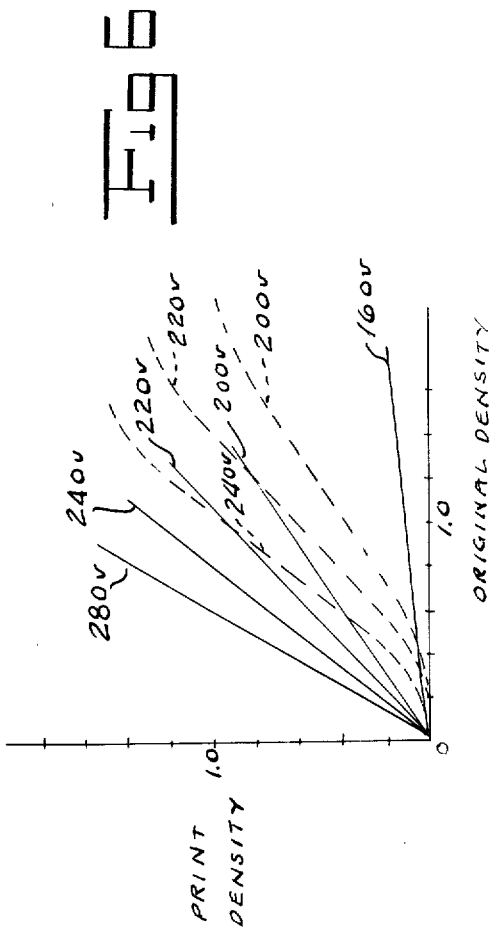
FIG. 6 is a diagrammatic view illustrating the relationship between print density as compared with original density at various power supply transformer input voltages with other parameters being held constant, the actual relationships being shown in broken lines and the idealized relationships being shown in solid lines.

Given a particular developer and photoconductive surface the gamma or density variance ratio can readily be determined for the machine being used. Each developing agent is tested for its characteristics and a chart such as that illustrated in FIG. 6 may be generated for each agent. To do so I may, for example, utilize a photographic step wedge of any conventional design to produce copies of the wedge using each developing agent to be used at each of a number of charging levels in increments of 10 volts. The maximum input voltage to the transformer 32 for full field strength on the photoconductor 50 is determined by instrumentally observing by means of an electrometer, for example, the field strength developed on a photoreceptor at a given input voltage during a tranverse of the charger at a predetermined speed of travel and noting the effect of repeated charging. When full field strength is reached on the first traverse, the maximum or full saturation input voltage setting has been determined. At the maximum setting and at successively lower transformer input voltage settings, copies are made of the photographic step wedge which, as is known in the art, has known calibrated steps. Any suitable means such, for example, as a densitometer may be employed to derive a plot of step wedge density calibration as an abcissa and copy print density and print density as the ordinate. The result will be a family of curves such as those illustrated in FIG. 6. Each curve is a plot of print density at various regions of the step wedge versus original density at corresponding regions of a particular transformer input voltage. The slopes of the resultant lines are the gamma characteristics. This gamma is directly analogous to the term as used in the photographic arts generally in which it indicates the degree of contrast of a developed photographic image. It is also the slope of the straight line portion of the characteristic curve of any photographic material or process. Thus, in electrophotography and as established by the family of curves shown in FIG. 6, a high gamma voltage is a relatively high corona voltage resulting in a relatively high electrostatic charge on the photoconductor which will produce an image of high contrast while a low gamma voltage is a relatively lower corona voltage resulting in a relatively lower electrostatic charge on the photoconductor which will produce an image of lower contrast.

It will readily be appreciated that the essential feature of my invention is the use of different charging levels in such a way as to achieve color correction. While I have described my method in connection with developers incorporating particular pigments, it will readily be appreciated that it is equally applicable to developers incorporating other pigments having defects similar to those of the pigments I have described. My method also is applicable to any instance in which a corrected color is to be electrostatically applied to the surface of a photoconductor.

It will be seen that I have accomplished the objects of my invention. I have provided a color correction process for electrostatic color printing which overcomes the defects of color correction systems of the prior art. My process compensates for the deficiencies in the developer materials used to make color prints in an electrostatic color printing system.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of electrophotographically producing a full color print of a multicolor original with cyan and magenta and yellow pigmented developers including the steps of applying a high gamma charge to the surface of a photoconductor, exposing said surface to an image of said original through a pass red filter, subjecting said surface to the action of a cyan pigmented developer, applying a second high gamma charge to said surface, exposing said surface to an image of said original through a minus red filter, applying a low gamma charge to said surface, exposing said surface to an image of said original through a pass green filter, subjecting said surface to the action of a magenta pigmented developer, applying a third high gamma charge to said surface, exposing said surface to an image of said original through a minus green filter, applying a second low gamma charge to said surface, exposing said surface to an image of said original through a pass blue filter and subjecting said surface to the action of a yellow pigmented developer.

2. A method of electrophotographically producing a full color print of a multicolor original with cyan and magenta and yellow pigmented developers including the steps of applying a first high gamma charge to the surface of a photoconductor, exposing said surface to an image of said original through a pass red filter, subjecting said surface to the action of a cyan pigmented developer, applying a second high gamma charge to said surface, subjecting said surface to the action of a magenta pigmented developer, applying a first low gamma charge to said surface, exposing said surface to an image of said original through a pass green filter, again subjecting said surface to the action of a magenta pigmented developer, applying a third high gamma charge to said surface, exposing said surface to an image of said original through a minus green filter, subjecting said surface to the action of a yellow pigmented developer, applying a second low gamma charge to said surface, exposing said surface to an image of said original through a minus red filter, and again subjecting said surface to the action of a yellow pigmented developer.

3. A method of electrophotographically printing an area of the surface of a photoconductor with the color red including the steps of applying a high gamma electrostatic charge over said surface, exposing said surface to an image of a multicolor original through a minus red filter, subjecting said surface to the action of a magenta pigmented developer, applying a low gamma electrostatic charge over said surface, exposing said surface to an image of an original through a filter which passes a color other than red, and subjecting said surface to the action of a yellow pigmented developer whereby said red area is developed with a major amount of magenta and a minor amount of yellow.

4. A method of electrophotographically printing an area of the surface of a photoconductor with the color blue including the steps of applying a high gamma electrostatic charge over said surface, exposing said surface to an image of a multicolor original through a filter which blocks blue, subjecting said surface to the action of a cyan pigmented developer, applying a low gamma electrostatic charge over said surface, again exposing said surface to an image of said original through a filter which blocks blue, and subjecting said surface to the action of a magenta pigmented developer whereby said area is developed with a major amount of cyan and a minor amount of magenta.

* * * * *